Aug. 21, 1928.
H. CAMINEZ
ENGINE MOUNTING
Filed April 2, 1927
1,681,219
2 Sheets-Sheet 2
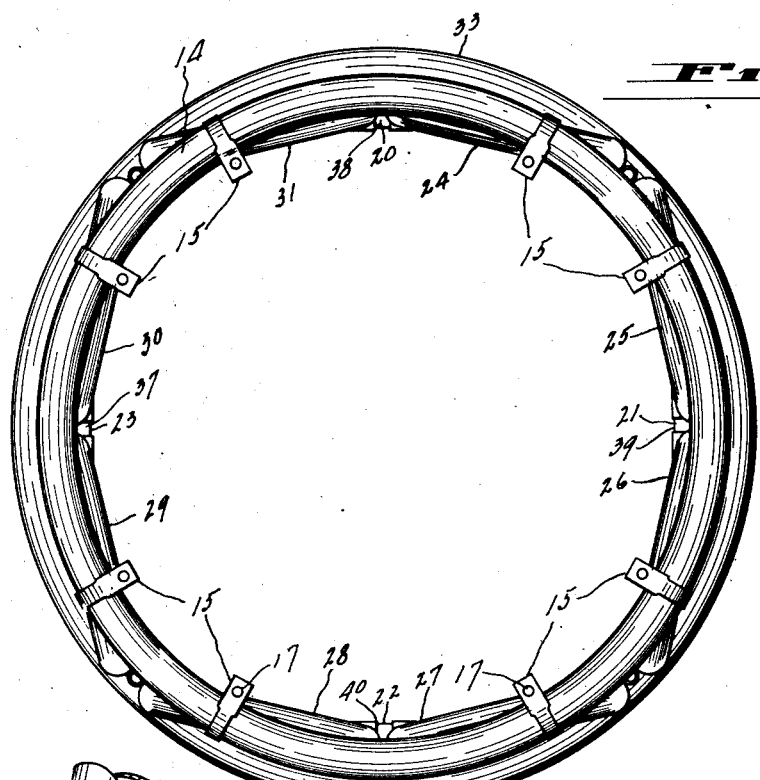
INVENTOR
Harold Caminez
BY Maréchal and Noe
ATTORNEY Patented Aug. 21, 1928.

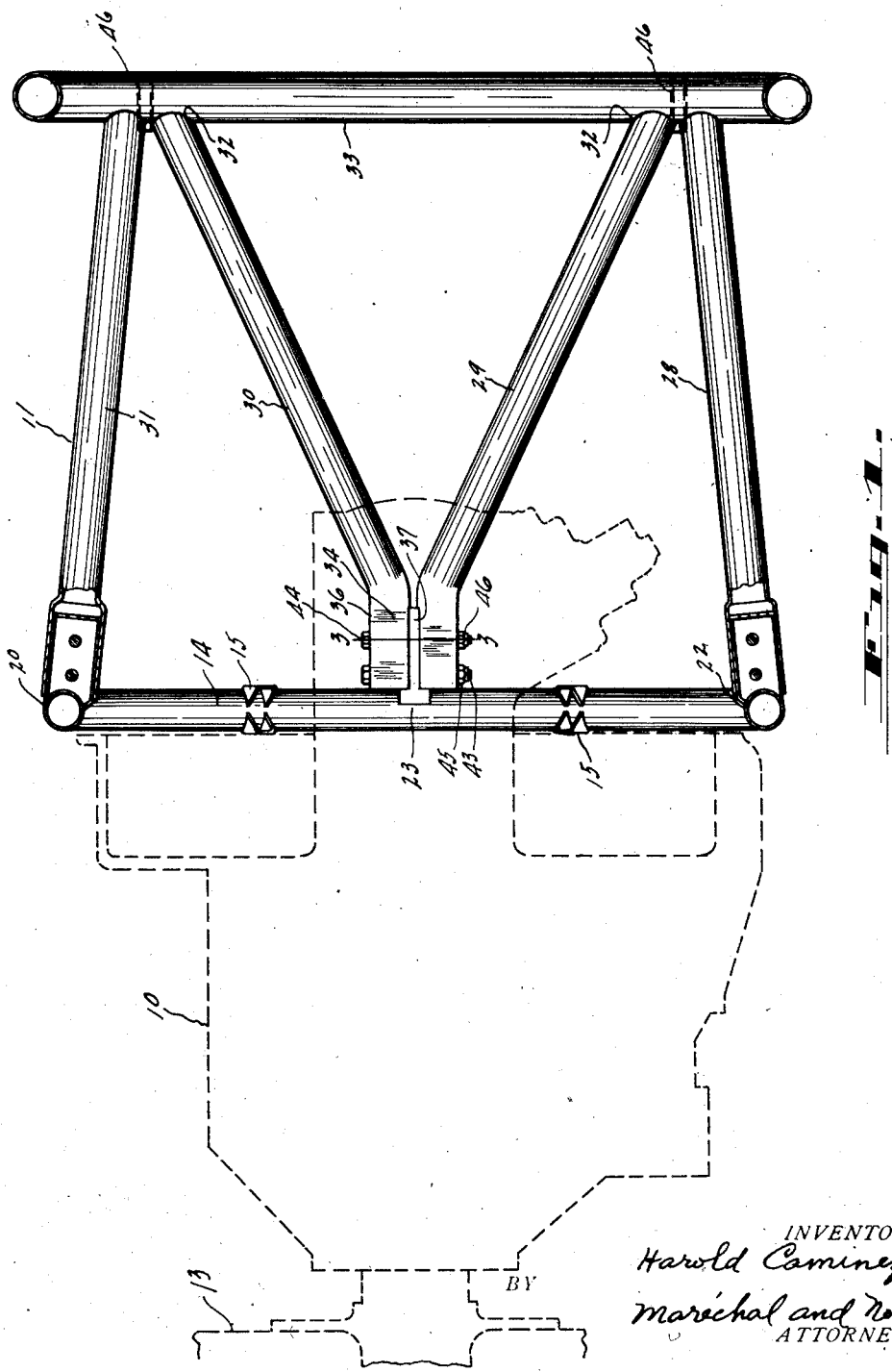

1,681,219

UNITED STATES PATENT OFFICE.

HAROLD CAMINEZ, OF FARMINGDALE, NEW YORK.

ENGINE MOUNTING.

Application filed April 2, 1927. Serial No. 180,499.

This invention relates to motor supports and particularly to supports of this character adapted to damp out vibrations of the engine which may be produced by motor torque reactions.

One object of the invention is the provision of an engine mount of this character having means for definitely fixing the drive shaft of a radial internal combustion engine while permitting vibrations of the engine due to motor torque reactions, these vibrations being absorbed and effectively prevented from being transmitted to the frame by which the engine is supported.

A further object of the invention is the provision of a motor mount which is resiliently supported at a number of points spaced at different locations about the motor axis so that vibrations due to motor torque reactions may be absorbed in the mount.

Other objects and advantages of the invention will be apparent from the following description and from the accompanying drawings in which:

Fig. 1 is a central vertical section through the engine mount showing the manner in which the engine is supported;

Fig. 2 is an end elevation of the engine mount;

Fig. 3 is a section on the line 3—3 of Fig. 1;

Fig. 4 is a detail view of a part of the engine supporting frame;

Fig. 5 is a section on the line 5—5 of Fig. 4; and

Fig. 6 is a detail view of an engine attaching strap.

Referring more particularly to the drawing by reference numerals in which corresponding numerals designate like parts in the various views, one form of the invention is shown as a means for attaching a radial internal combustion aircraft engine 10 to a supporting frame designated generally 11 which may be attached to or form a part of a fuselage structure of an airplane. The internal combustion engine 10 is provided with a number of cylinders radially arranged about the axis 12 of the engine shaft at the front of which is mounted the airplane propeller 13 by means of which the airplane is propelled. The rear end of the engine body is attached to a motor supporting ring 14 by means of the motor supporting straps 15 provided at spaced points along the supporting ring. These straps as shown are formed of bent pieces of metal, see Fig. 6, provided with holes 17 for the reception of the bolts 18 which are threaded into the rear end of the engine body. The bolts 18 draw the opposed strap surfaces 19 and 20 together thus firmly clamping the straps on the ring 14 and rigidly attaching the engine to this ring. The ring 14 is formed of a circular metal tube preferably of integral construction. This ring is attached at the spaced points 20, 21, 22 and 23 to metal attaching arms 24 to 31 inclusive provided on the motor supporting frame 11. These various attaching arms are firmly attached as by means of the welds 32 to the tubular supporting member 33 which may be attached to or form a part of the fuselage frame-work, the sleeves 46 which are welded in place within the member 33 forming a convenient means of attachment to other fuselage frame members. The attaching arms extend forwardly from the member 33 in pairs, converging at their forward ends to the attachment points 20, 21, 22 and 23 to provide a skeleton supporting structure.

The two attaching arms 29 and 30 as shown in Fig. 1 extend in converging relation away from the supporting member 33. These arms are preferably of tubular metal construction and at their forward ends they are each shaped to provide a channel having sides 34 and 35 and the back 36. The motor supporting ring 14 is provided at the attachment point 23 with a projecting lug 37 of rectangular hollow metal having a width corresponding to the distance between the inner surfaces of the sides 34 and 35 of the channel shaped end of the attaching arms. This lug is welded on the ring 14 so as to project rearwardly as shown. Blocks of rubber 41 and 42 of substantially the same width as the lug 37 are located one on each side of the lug and received in the two channel ends of the attaching arms 29 and 30. Attaching bolts 43 and 44 extend directly through the blocks of rubber and through holes provided in the lugs and in the channel ends of the arms 29 and 30, and nuts 45 and 46 on the ends of these bolts are tightened in place so that the blocks of rubber 41 and 42 will be maintained under compression within the spaces provided between the lug and the enclosing channels. The holes in the lug and in the channel backs are just large enough so that they will neatly receive the attaching bolts without permitting any lateral play or lost motion. Slight relative movement of the lug along the bolts in the direction of the bolt axes however, is permitted, although such motion is resisted by the compressed rubber strips or blocks 41 and 42.

The ring 14 is provided with four lugs as indicated at 37, 38, 39 and 40 suitably spaced at different locations about the axis of the shaft of the engine. The lugs 38 and 40 are positioned above and below the engine axis respectively and the lugs 37 and 39 are located substantially in the same horizontal plane as the engine axis. The connection just described in reference to the manner in which the attaching arms 29 and 30 are connected to the attaching lug 37 of the engine supporting ring is duplicated in the same manner at the attachment points 20, 21 and 22. In each case however, the connection is such that the lugs are yieldingly restrained in their movements along the attaching bolts when so urged by reason of the engine torque reaction. The attaching bolts at the connections 21 and 23 are arranged vertically to permit vertical motion of the engine in relation to the supporting frame 11 while horizontally supporting the engine and ring 14 by a metal to metal connection. The attaching bolts at the connections 20 and 22 extend horizontally to permit horizontal motion of the engine in relation to the frame 11 while supporting the entire weight of the engine in a definite manner by a metal to metal connection. Collectively the four attaching points permit only vibrational movements of the engine about the engine shaft axis and definitely fix the engine axis in relation to the supporting frame 11. Any vibrational movements of the engine due to torque reaction are absorbed by the rubber blocks in the various connections all of which permit and yieldingly restrain motions of this character about the engine axis, so that these engine vibrations transmitted directly to the supporting ring 14 will be effectively absorbed and prevented from being transferred to the engine supporting frame 11. The rubber blocks being placed under compression between the lugs on the ring 14 and the ends of the arms of the frame 11 are effective without substantial deterioration over long periods of time. None of the rubber blocks are effective in supporting the weight of the engine itself since the engine weight and the forward pull of the engine is exerted directly through the metal to metal contact obtained at the various connections. All of the rubber blocks are initially under some definite state of compression, which may be made uniform at the four points of connection, and the elasticity of the rubber may thus be most effectively utilized in absorbing the motor torque reactions.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A motor mount comprising a frame, a motor support, resilient means between said frame and said support for absorbing motor torque reactions, and attachment members connecting said frame and said support so as to place said means under compression, said attachment members being spaced about the axis of the motor shaft at at least three different locations about said axis, said attachment members collectively attaching said frame to said support so that relative movement of the motor shaft axis in any direction is prevented.

2. A motor mount comprising a frame, a motor support, resilient means between said frame and said support for absorbing motor torque reactions, and attachment members connecting said frame and said support so as to place said means under compression, said attachment members being spaced about the motor shaft axis in a substantially common plane and positioned in at least three different spaced locations about said axis, each of said attachment members permitting only one degree of freedom of motion between the motor support and the frame, the various attachment members permitting relative motion between the motor support and the frame in different directions so that the motor shaft axis is maintained in a definite position in relation to the said frame while the motor and motor support are free to vibrate due to motor torque reactions about the shaft axis.

3. A motor mount comprising a frame, a motor support normally positioned in a substantially vertical plane, rubber blocks between said frame and said support for absorbing motor torque reactions, and attaching bolts connecting said frame and said support and placing said blocks under compression, said attachment bolts being provided in at least three different spaced locations about the axis of the motor shaft and arranged with their axes in substantial alignment with the vibrational movements of the engine due to motor torque reactions so that the motor is definitely positioned upon said frame.

4. A mount for radial internal combustion engines comprising a frame, an annular motor support, resilient means between said frame and said support for absorbing engine torque reactions, and attaching members connecting said frame and said support spaced about the axis of the engine in at least three different locations about said axis, some of said attachment members preventing lateral movements of the engine on the frame and others of said attachment members preventing vertical movements of the engine on said frame and all of said attachment members permitting vibrational movements of the engine about the engine axis.

5. A mount for a radial internal combustion aircraft engine comprising a fuselage frame, a support adapted to be attached to the engine, elastic blocks between said frame and said support for absorbing the motor torque reactions, and means supporting the weight of the engine by a metal to metal contact on said frame for definitely fixing the engine axis in relation to the frame while permitting vibrations due to engine torque reactions to be absorbed by said blocks.

6. A mount for radial internal combustion engines comprising a frame, a motor support ring, rubber blocks between said frame and said ring for absorbing motor torque reactions, and attaching bolts connecting said frame and said ring and placing said blocks under compression, said attachment bolts being spaced about said ring in at least three different locations about the engine axis and having their longitudinal axes located in substantial alignment with the vibrational movements due to motor torque reactions at the adjacent engine parts so that the engine and support ring are permitted to vibrate about the engine axis but are definitely located as a whole in relation to said frame.

7. A mount for radial internal combustion engines comprising a skeleton frame, an overhanging engine support ring adapted to be rigidly attached to the engine, projections extending from said ring and adapted to be engaged by said skeleton frame at a number of points around the ring, and rubber blocks on both sides of each of said projections against which said skeleton frame bears, and attachment members connecting said projections and said skeleton frame, adjacent attachment members being arranged at different angles in a substantially common plane perpendicular to the engine shaft axis so that all of said attachment members permit vibrations of the engine about the engine axis and collectively definitely locate said engine axis in relation to the frame.

8. A mount for radial internal combustion engines comprising a frame, a motor support ring adapted to be attached to an engine so that said engine axis extends substantially horizontal, attaching arms on said frame, attaching lugs on said ring, rubber blocks on each side of said lugs against which said arms press, attaching bolts extending through said arms and through said lugs and arranged at different locations about said ring with their axes all in substantial alignment with the vibrational movements of the engine at the points of connection due to motor torque reactions.

9. A mount for internal combustion engines comprising a frame, a series of attachment members spaced from each other and from the axis of the motor shaft, attached to said frame for fastening said engine to said frame to vertically support the entire weight of the engine by a metal to metal contact, and yielding means interposed between the engine and the frame for absorbing engine torque reactions.

10. A mount for radial internal combustion aircraft engines comprising a fuselage frame, means for fastening said engine in front of said frame to vertically and horizontally support the entire weight of the engine on said frame in a rigid manner, and compressed elastic strips interposed between the engine and the frame so that the weight of the engine is not applied to the strips for absorbing motor torque reactions.

In testimony whereof I hereto affix my signature.

HAROLD CAMINEZ.